United States Patent
Aozasa (10) Patent No.: US 6,171,572 B1
(45) Date of Patent: Jan. 9, 2001

(54) METHOD FOR PREPARING A ZIRCONIUM-CERIUM COMPOSITE OXIDE

(75) Inventor: Shigeru Aozasa, Amagasaki (JP)

(73) Assignee: Anan Kasei Co., Ltd., Hyogo-Ken (JP)

(*) Notice: Under 35 U.S.C. 154(b), the term of this patent shall be extended for 0 days.

(21) Appl. No.: 09/331,821

(22) PCT Filed: Dec. 24, 1997

(86) PCT No.: PCT/JP97/04786

§ 371 Date: Jun. 22, 1999

§ 102(e) Date: Jun. 22, 1999

(87) PCT Pub. No.: WO98/29341

PCT Pub. Date: Jul. 9, 1998

(30) Foreign Application Priority Data

Dec. 27, 1996 (JP) .................................................. 8-349679

(51) Int. Cl.$^7$ .......................... C01F 17/00; C01G 25/02; B01J 23/00; B01J 23/10
(52) U.S. Cl. ......................... 423/593; 502/304; 502/349
(58) Field of Search ................................... 502/302, 304, 502/340, 345, 349, 303, 341, 350, 351, 355; 423/593

(56) References Cited

U.S. PATENT DOCUMENTS

| | | | |
|---|---|---|---|
| 4,927,799 | * | 5/1990 | Matsumoto et al. ................. 502/303 |
| 5,626,826 | * | 5/1997 | Chopin et al. ..................... 423/213.2 |
| 5,712,218 | * | 1/1998 | Chopin et al. ..................... 502/304 |
| 5,883,037 | * | 3/1999 | Chopin et al. ..................... 502/308 |
| 6,030,914 | * | 2/2000 | Matsui ............................... 501/103 |

FOREIGN PATENT DOCUMENTS

| | | |
|---|---|---|
| 7-16452 | 1/1995 | (JP) . |
| 7-16460 | 1/1995 | (JP) . |
| 7-315840 | 12/1995 | (JP) . |
| 6-316416 | 2/1996 | (JP) . |
| 8-109020 | 4/1996 | (JP) . |
| 8-109021 | 4/1996 | (JP) . |
| 9-175822 | 7/1997 | (JP) . |
| 9-175823 | 7/1997 | (JP) . |

* cited by examiner

Primary Examiner—Steven P. Griffin
Assistant Examiner—Christina Ildebrando
(74) Attorney, Agent, or Firm—Darby & Darby (57) ABSTRACT

A zirconium—cerium composite oxide having excellent heat resistance and being capable of maintaining its large specific surface area even when used under high-temperature conditions, which composite oxide contains zirconium and cerium at a weight ratio of 51 to 95:49 to 5 in terms of zircomium oxide and ceric oxide, the composite oxide having a specific surface area of not smaller than 50 m$^2$/g, wherein said composite oxide is capable of maintaining a specific surface area of not smaller than 20 m$^2$/g even after heating at 1100° C. for 6 hours, a method for preparing the same, and a co-catalyst for purifying exhaust gas prepared with the composite oxide.

4 Claims, 3 Drawing Sheets

METHOD FOR PREPARING A ZIRCONIUM-CERIUM COMPOSITE OXIDE

FIELD OF ART

The present invention relates to a zirconium—cerium composite oxide that has excellent heat resistance useful in the fields of catalysts, functional ceramics, and solid electrolyte for fuel cells, and particularly suitable for use as a co-catalyst for purifying vehicle exhaust gas. The present invention also relates to a process for preparing such a composite oxide, and a co-catalyst for purifying vehicle exhaust gas.

BACKGROUND ART

Catalysts for purifying vehicle exhaust gas are composed of a catalytic metal such as platinum, palladium, or rhodium, and a co-catalyst for enhancing the catalytic action of the metal, both supported on a catalyst matrix made of, for example, alumina or cordierite. As such a co-catalyst are used cerium oxide-containing materials, which have oxygen absorbing and desorbing capability originated in cerium oxide, i.e., the properties of absorbing oxygen under the oxidizing atmosphere and desorbing oxygen under the reducing atmosphere. With this oxygen absorbing and desorbing capability, the cerium oxide-containing materials purify noxious components in exhaust gases such as hydrocarbons, carbon monoxide, and nitrogen oxides at excellent efficiency. Accordingly, the cerium oxide-containing materials are widely used as a co-catalyst. The property of cerium oxide is further enhanced by zirconium oxide. Thus, zirconium—cerium composite oxide is now a prevailing co-catalyst, and consumption thereof has been increasing.

It is critical for activating the function of a co-catalyst made of the composite oxide to keep the co-catalyst at a high temperature. Low temperature of the exhaust gas, for example at engine start-up, will result in low purifying efficiency. Vehicle manufacturers are presently trying to solve this problem by placing the catalyst system close to the engine for introducing hot exhaust gas right after its emission from the engine into the catalyst system.

In this case, another problem is imposed on the heat resistance of the catalyst. In general, the efficiency of exhaust gas treatment is proportional to the contact area between the active phase of the catalyst and the exhaust gas, so that the co-catalyst is required to have a sufficiently large specific surface area. However, particles of the conventional zirconium—cerium composite oxide grow when they are exposed to the high-temperature operative environment for a long period of time, resulting in reduced specific surface area. The conventional composite oxide is thus not satisfactory in heat resistance, so that co-catalysts are eagerly demanded that are capable of stably maintaining a large specific surface area.

There are proposed some methods for preparing a zirconium—cerium composite oxide having good heat resistance, for example, in JP-A-6-279027 and JP-B-8-16015. These references disclose a method including the steps of mixing a zirconium sol and a cerium sol, and adding a base to generate precipitate; and a method including spray drying. As to the heat resistance, the resulting mixed oxide is disclosed to have the specific surface area of 15 m²/g after calcination at 1000° C.

There is proposed in JP-A-5-193948 a method for preparing a mixed oxide including calcining a mixture of a hydrated zirconia sol having the average particle size of not larger than 0.2 μm and a compound of Ce, Y, Ca, Mg, or the like. As to the heat resistance, the obtained mixed oxide is disclosed to have the specific surface area of 12 m²/g after calcination at 1050° C.

There is also proposed in JP-A-5-116945 a method for preparing a mixed oxide including calcining a mixture of a hydrated zirconia sol having the average particle size of 0.05 to 0.3 μm and crystallite size of not larger than 4 nm and a compound of Ce, Y, Ca, Mg, or the like. As to the heat resistance, the obtained mixed oxide is disclosed to have the specific surface area of 15 m²/g after calcination at 850° C.

JP-A-5-155622 proposes a method for preparing a zirconium oxide including mixing an aqueous solution of a zirconium salt with a hydroxide, hydrated oxide, or oxide of a metal with the valency of two or more, followed by hydrolysis. As to the heat resistance, the obtained mixed oxide is disclosed to have the specific surface area of 8 m²/g after calcination at 1000° C.

All of the above-mentioned methods have the problem of long operation time for preparing the objective oxide. For example, in the method using a zirconia sol, it takes over 100 hours to hydrolyze the aqueous solution of a zirconium salt, which imposes a problem in productivity.

The large specific surface area may be achieved by suppressing the crystallite size, i.e. suppressing the growth of the crystal grains of the oxide. For example, the methods disclosed in JP-A-6-279027 and JP-B-8-16015 mentioned above using a zirconia sol (colloidal zirconia particles of 5 to 500 nm size) are optimum for this purpose. Since such fineness of the crystal grains and particles of the oxide causes extreme sensitivity to thermal energy, the oxide produced by these conventional methods is remarkably reduced in specific surface area when calcined at a high temperature in the range of 900° C. or higher, and thus has poor heat resistance. Accordingly, such an oxide is not suitable for use as a co-catalyst, which is to be exposed to a high operation temperature. Further, many of the methods proposed hitherto have problems in that contamination of impurities, such as chlorine or sulfur, which originate from the starting materials and have adverse effects on the catalyst, cannot be eliminated.

DISCLOSURE OF THE INVENTION

It is therefore an object of the present invention to provide a zirconium—cerium composite oxide which has excellent heat resistance suitable for a co-catalyst for exhaust gas purification, and which is capable of maintaining a large specific surface area even in its use under high temperature environment, a method for preparing such a composite oxide, and a co-catalyst for purifying exhaust gas.

It is another object of the present invention to provide a method for preparing a zirconium—cerium composite oxide having excellent heat resistance, with good reproducibility and in an economical manner.

It is yet another object of the present invention to provide a method for preparing a zirconium—cerium composite oxide which has excellent heat resistance and which is free of impurities adversely affecting the catalyst, such as chloride and sulfur.

The present inventor has made intensive research on the effect of zirconium starting materials, with the intention of discovering the cause of the drop in the specific surface area observed in the conventional zirconium—cerium composite oxide upon heating at a high temperature, irrespective of its large specific surface area before the heating. There is known a method for preparing a composite oxide having high degree of solid solution of zirconium oxide and cerium oxide, wherein a precursor of a composite oxide is obtained by mixing a zirconium sol or an aqueous solution of a zirconium salt, and a cerium sol or an aqueous solution of cerium salt, followed by addition of a base to generate precipitate of the precursor. The precursor thus obtained is extremely sensitive to thermal energy possibly due to its microcrystallinity, and converted, as a result of calcination, to a zirconium—cerium composite oxide of a single phase with high degree of solid solution. It has been confirmed, however, that calcination at a high temperature causes remarkable drop in the specific surface area of the composite oxide, so that the large specific surface area cannot be maintained. Then, the inventor has made intensive efforts to increase the crystallinity of the precursor, and studied possible use of zirconium hydroxide powders and the effect of its particle size, which have not hitherto been taken into account as a zirconium starting material for a composite oxide having a large specific surface area. As a result, he has found out a reaction method for obtaining a precursor having these powders as a matrix and a cerium component and optionally additional components compounded therein, thereby completing the present invention.

According to the present invention, there is provided a zirconium—cerium composite oxide and a co-catalyst for purifying exhaust gas comprising powders of the composite oxide, said composite oxide comprising zirconium and cerium at a weight ratio in a range of 51 to 95:49 to 5 in terms of zirconium oxide and ceric oxide, said composite oxide optionally comprising a metal selected from the group consisting of yttrium, scandium, lanthanum, praseodymium, neodymium, samarium, europium, gadolinium, magnesium, calcium, barium, aluminum, titanium, hafnium, and mixtures thereof, in a total amount in terms of oxides of 0.1 to 20% by weight of the composite oxide, wherein said composite oxide has a specific surface area of not smaller than 50 m$^2$/g, and is capable of maintaining a specific surface area of not smaller than 20 m$^2$/g even after heating at 1100° C. for 6 hours.

According to the present invention, there is also provided a method for preparing the zirconium—cerium composite oxide comprising the steps of:

reacting under heating a mixture comprising zirconium hydroxide powders having an average particle size of 0.5 to 50 μm, a cerium sol having an average colloidal particle size of 3 to 100 nm, and optionally one or more members selected from the group consisting of salts of yttrium, scandium, lanthanum, praseodymium, neodymium, samarium, europium, gadolinium, magnesium, calcium, barium, aluminum, titanium, and hafnium, in the presence of 5 to 10 moles of nitric acid per mole of cerium in said mixture, adding a base, and further reacting a resulting mixture to precipitate a product, and calcining said product at 500 to 1000° C.

PREFERRED EMBODIMENT OF THE INVENTION

The present invention will now be explained in detail hereinbelow.

Referring to the zirconium—cerium composite oxide of the present invention, the term "composite oxide" means that zirconium oxide and cerium oxide together form not a mere mixture, but a partial or substantial composite oxide or a solid solution. In the application of this composite oxide to a co-catalyst, it is the cerium oxide that exhibits oxygen absorbing and desorbing capability, whereas the zirconium oxide functions to enhance the heat resistance of the cerium oxide to allow it to exhibit the oxygen absorbing and desorbing capability over a wide temperature range.

In the composite oxide of the present invention, zirconium:cerium weight ratio is 51 to 95:49 to 5, preferably 55 to 85:45 to 15, more preferably 60 to 80:40 to 20 in terms of zirconium oxide ($ZrO_2$) and ceric oxide ($CeO_2$). With the zirconium content of less than 51 in terms of zirconium oxide, excellent heat resistance cannot be achieved; whereas with the zirconium content of more than 95, the oxygen absorbing and desorbing capability originated from cerium oxide is insufficiently exhibited. The total content of zirconium and cerium together is preferably 80 to 100% by weight of the composite oxide in terms of zirconium oxide and ceric oxide.

The composite oxide of the present invention has the specific surface area of not smaller than 50 m$^2$/g. In general, the higher the calcination temperature in the manufacturing process, the smaller the specific surface area. According to the present invention, the composite oxide has a large specific surface area, for example, of not smaller than 90 m$^2$/g when prepared through calcination at 500° C. for 6 hours, of not smaller than 70 m$^2$/g when prepared through calcination at 900° C. for 6 hours, and of not smaller than 50 m$^2$/g when prepared through calcination at 1000° C. for 6 hours. The maximum specific surface area of the present composite oxide is not particularly limited, but is about 120 m$^2$/g. A material having such a large specific surface area at these calcination temperatures is not known among the conventional zirconium—cerium composite oxides. The composite oxide of the present invention, when used, for example, as a co-catalyst, is capable of maintaining the specific surface area of not smaller than 20 m$^2$/g, preferably 20 to 30 m$^2$/g, even after heating at 1100° C. for 6 hours. In general, when oxide powders are calcined at a temperature above a particular temperature range determined by their composition or production process, the powders grow remarkably to cause drop in the specific surface area. In zirconium—cerium composite oxides, this drop is remarkable at a temperature of about 1000° C. or higher, so that the current catalyst system for purifying exhaust gas is designed to operate usually at about 900° C. or lower. In the present invention, in order to indicate the performance of a composite oxide that is adapted for use as a co-catalyst operative at a temperature of as high as about 1000° C., i.e. the operation temperature of future requisite, the specific surface area of the composite oxide retained after heated at 1100° C. for 6 hours is employed as the property index. The temperature, 1100° C., is recognized as the maximum operation temperature, and thus used for evaluating the heat resistance of a composite oxide. The specific surface area referred to in the specification is measured according to BET method utilizing absorption of nitrogen gas, which is a standard method for measuring the specific surface area of powders.

The composite oxide of the present invention may optionally contain, in addition to zirconium and cerium, one or more members selected from the group consisting of yttrium, scandium, lanthanum, praseodymium, neodymium, samarium, europium, gadolinium, magnesium, calcium, barium, aluminum, titanium, and hafnium, in a total amount in terms of oxides of 0.1 to 20% by weight of the total amount of the composite oxide. Addition of the particular metal further improves the heat resistance of the composite oxide. With less than 0.1% by weight of the metal, no improvement is achieved in the heat resistance. Addition of more than 20% by weight of the metal causes relative reduction of the cerium content, which results in insufficient oxygen absorbing and desorbing capability compared to the level required for a co-catalyst, thus being not preferred.

According to the method of the present invention, the composite oxide mentioned above may be prepared with good reproducibility and in an economical manner. In this method, a mixture containing a particular zirconium material and a particular cerium material is reacted in the presence of a particular amount of nitric acid under heating.

The particular zirconium material is zirconium hydroxide powders having an average particle size of 0.5 to 50 $\mu$m, preferably 1 to 30 $\mu$m, more preferably 5 to 25 $\mu$m. With the average particle size of smaller than 0.5 $\mu$m, a composite oxide having excellent heat resistance and the large specific surface area intended in the present invention cannot be obtained. The average particle size of larger than 50 $\mu$m results in a composite oxide having a smaller specific surface area. The zirconium hydroxide is a generic term for (1) zirconium hydroxide $Zr(OH)_4 \cdot nH_2O$, (2) zirconium oxyhydroxide $ZrO(OH)_2 \cdot nH_2O$, and (3) hydrated zirconia $ZrO_2 \cdot nH_2O$. One of these or a mixture of two or more of these may be used.

The zirconium hydroxide powders may be commercially available powdered-form products, or may also be prepared by a known method, including adding a base such as ammonia water, ammonia gas, sodium hydroxide, or potassium hydroxide to an aqueous solution of a zirconium salt such as zirconium nitrate, zirconium chloride, or zirconyl nitrate to precipitate the zirconium hydroxide. In particular, the method using zirconyl nitrate and ammonia is advantageous since impurities, such as chlorine or sulfur, having adverse effect are not included. Incidentally, the average particle size was measured by a particle size analyzer (type MK II) manufactured by LEEDS & NORTHRUP CO., LTD. utilizing laser diffraction.

The particular cerium material is a cerium sol having an average colloidal particle size of 3 to 100 nm, preferably 5 to 80 nm, more preferably 10 to 50 nm. The cerium sol includes in general a cerium oxide sol, a hydrated cerium oxide sol, a cerium hydroxide sol, each containing particles of the colloid size, or a mixture thereof, in which solid fine particles (colloidal particles) are dispersed in an aqueous medium. If the average colloidal particle size is smaller than 3 nm, production in industrial scale will be difficult. If the average colloidal particle size is larger than 100 nm, the colloidal particles do not compound to zirconium oxide easily in the later process. The average colloidal particle size was measured by a Dynamic Light Scattering Photometer (DLS-7000) manufactured by OTSUKA ELECTRONICS CO. in accordance with dynamic light scattering measurement method.

The method for preparing the cerium sol is not particularly limited, and may include known methods such as hydrolysis of an aqueous solution of ceric nitrate. Alternatively, a commercially available cerium sol having the concentration of about 100 to 200 g/liter in terms of cerium oxide may also be used. The commercially available cerium sol is usually acidified with nitric or acetic acid in order to stabilize the sol state, and either type may be used. It is desired, however, to select a product containing minimum residual impurities, such as chlorine or sulfur, originating from the starting materials for cerium sol production.

In the mixture mentioned above, the mixing ratio of the zirconium hydroxide powders and the cerium sol may suitably be selected so as to be at a theoretical ratio corresponding to the composition of an objective zirconium—cerium composite oxide. It is preferred, for example, to mix zirconium and cerium at a weight ratio in the range of 51 to 95:49 to 5 in terms of zirconium oxide and ceric oxide. The mixture may preferably be prepared by measuring the zirconium hydroxide powders and the cerium sol, and mixing them together with a suitable amount of water to prepare a mixture in the form of a slurry. The total concentration of the zirconium hydroxide powders and the cerium sol in the resulting mixture is preferably 10 to 200 g/liter, more preferably 20 to 150 g/liter in terms of oxides.

The mixture may optionally contain one or more salts selected from the group consisting of salts of yttrium, scandium, lanthanum, praseodymium, neodymium, samarium, europium, gadolinium, magnesium, calcium, barium, aluminum, titanium, and hafnium, if desired. The salts may be selected from nitrates, chlorides, sulfates, and other water-soluble salts. Besides water-soluble salts, compounds that are dissolved and ionized when heated in the presence of nitric acid in the next step may also be used. Particularly preferred are nitrates that do not cause adversely affecting impurities to remain in the resulting composite oxide. The salt is preferably measured and mixed in a theoretical amount that results in the total salt amount in terms of oxides of 0.1 to 20% by weight of the resulting composite oxide. Such a component in the mixture other than zirconium and cerium is finely dispersed in the form of a solid solution or an oxide in the resulting composite oxide, and functions to prevent the growth of crystal grains of the composite oxide at a high temperature.

The reaction of the mixture under heating is preferably carried out under stirring, and 5 to 10 moles, preferably 5.5 to 8 moles, and more preferably 5.8 to 7 moles of nitric acid is required per mole of cerium in the mixture. When the cerium sol in the mixture has been stabilized by acidification with nitric acid as mentioned above, the above-mentioned amount of nitric acid in mole to be present is adjusted to include such nitric acid used for acidification. When the cerium sol has been stabilized by acidification with acetic acid as mentioned above, the amount of nitric acid in mole mentioned above is added. In the presence of the particular amount of nitric acid, crystals of the zirconium hydroxide powders and the cerium sol particles undergo repeated elution and crystallization, so that zirconium and cerium compound to each other while growth of the crystals proceeds. With less than 5 moles of nitric acid, sufficient crystal growth cannot be achieved, resulting in poor heat resistance of the composite oxide. With more than 10 moles of nitric acid, zirconium hydroxide powders dissolve to generate increased amount of ionized zirconium, which reacts with a base in the following step to generate fine precipitate. The generation of fine precipitate prevents generation of sufficiently grown precursor intended in the present invention, and as a result, a composite oxide having excellent heat resistance cannot be obtained.

The reaction in the presence of nitric acid under heating may be carried out at the reaction temperature of 60 to 150° C., preferably 80 to 140° C., for the duration of 1 to 36 hours. The reaction is preferably carried out under atmospheric pressure or increased pressure. Reaction under increased pressure may be carried out in a pressurized vessel such as an autoclave under pressure of about 1.5 to 10 kg/cm$^2$, resulting in shortened reaction time.

Figure 1:
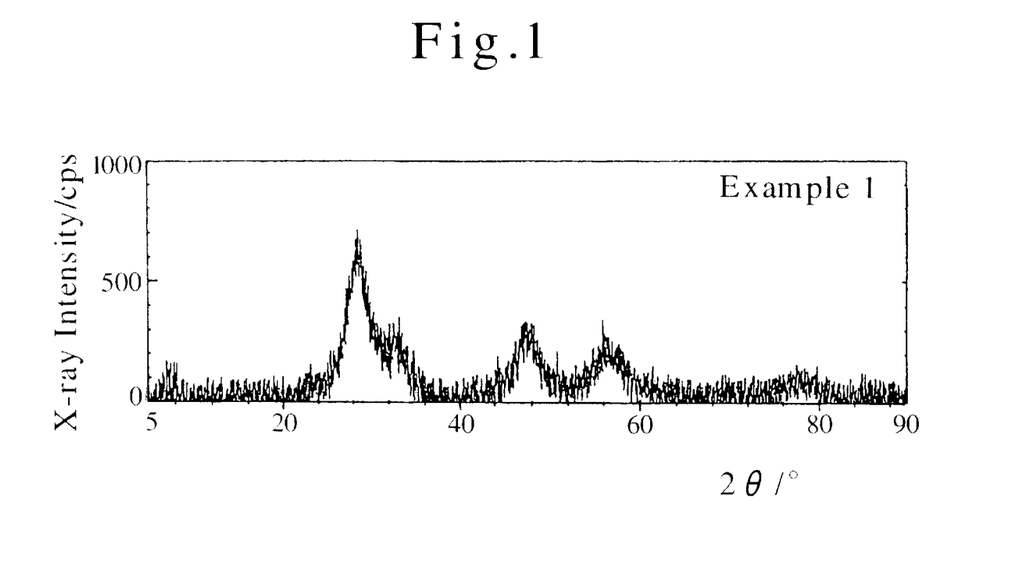
FIG. 1 is a graph illustrating the results of X-ray diffraction of the precipitate obtained in Example 1 before the calcination.
Figure 2:
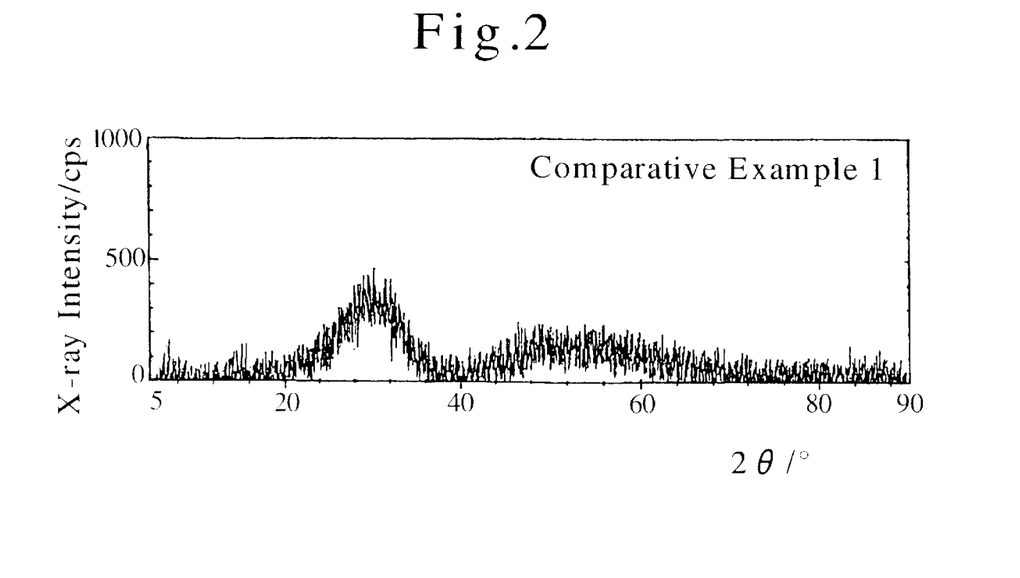
FIG. 2 is a graph illustrating the results of X-ray diffraction of the precipitate obtained in Comparative Example 1 before the calcination.

In the method of the present invention, a base is added to the reacted mixture, and further reaction is carried out to precipitate a product. This further reaction may be carried out, for example, by cooling the mixture reacted in the presence of nitric acid down to a temperature of preferably 60° C. or below, more preferably 50° C. or below, adding a base, and stirring the resulting mixture to proceed the reaction. The base may be sodium hydroxide, potassium hydroxide, ammonia water, ammonia gas, or mixtures thereof, among which ammonia water is preferred. The base may be added by preparing an aqueous solution of a suitable base concentration, and adding the solution to the cooled mixture under stirring; or when ammonia gas is used, blowing the gas into the vessel under stirring. The maximum amount of the base may easily be determined by measurement of pH change in the mixture. The pH in excess of 10 indicates that sufficient amount of the base has been added for completing the reaction. Through this reaction, substantially all of the solids and metal ions present in the mixture form a composite, and precipitate in the form of a product having sufficiently-grown crystals. FIGS. 1 and 2 illustrate the results of X-ray diffraction of the products at this stage prepared in Example 1 and Comparative Example 1, respectively, measured under the same conditions. It is seen from these figures that the product according to the present invention is highly crystalline. This product is a suitable precursor for obtaining an objective composite oxide having excellent heat resistance. The precursor may be separated, for example, by Nutsche method, centrifugal method, or filter pressing method. Further, the separated precipitate may be washed with water, or suitably dried to improve the efficiency in the next calcination step, if necessary.

Figure 3:
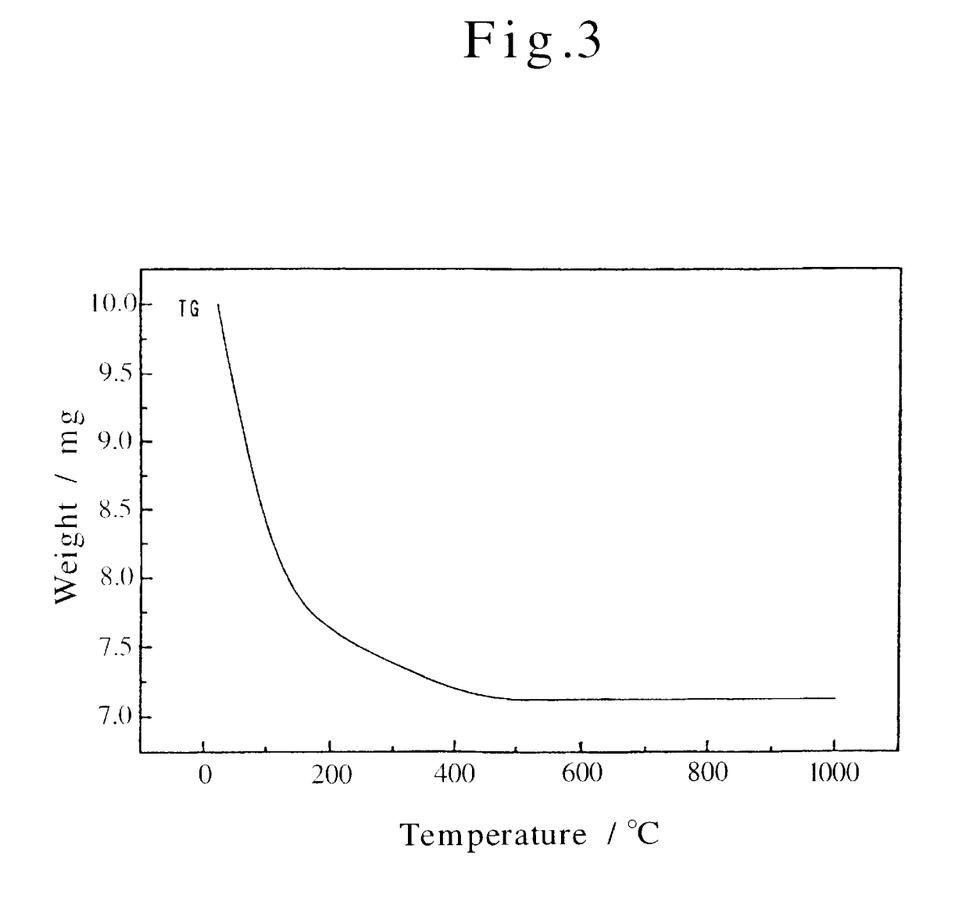
FIG. 3 is a graph illustrating the thermogravimetry (TG) of the precipitate obtained in Example 1.
Figure 4:
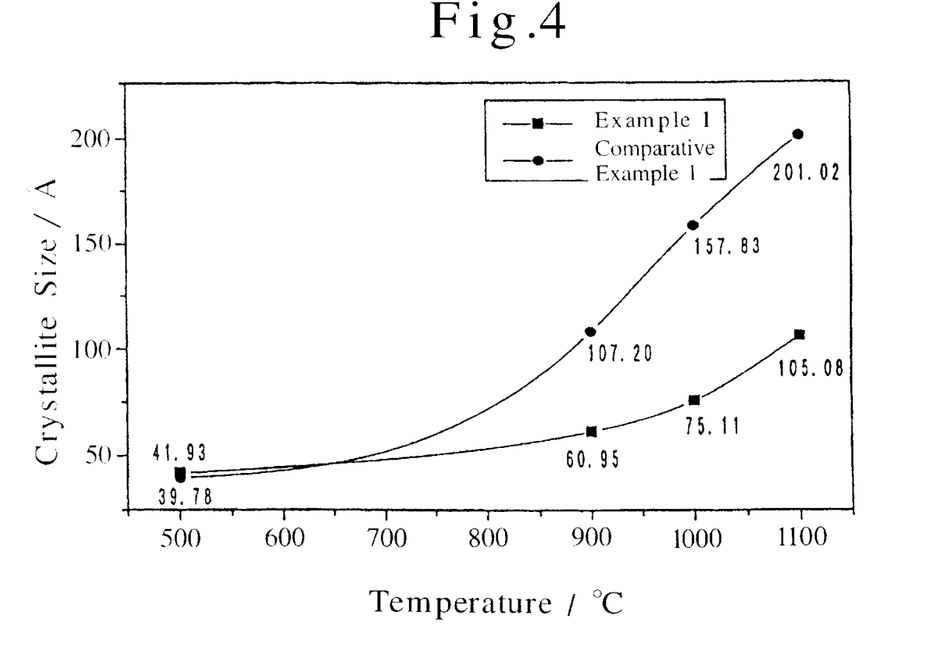
FIG. 4 is a graph indicating comparison of Example 1 and Comparative Example 1 in heat resistance, illustrated in the crystallite size versus calcination temperature.
Figure 5:
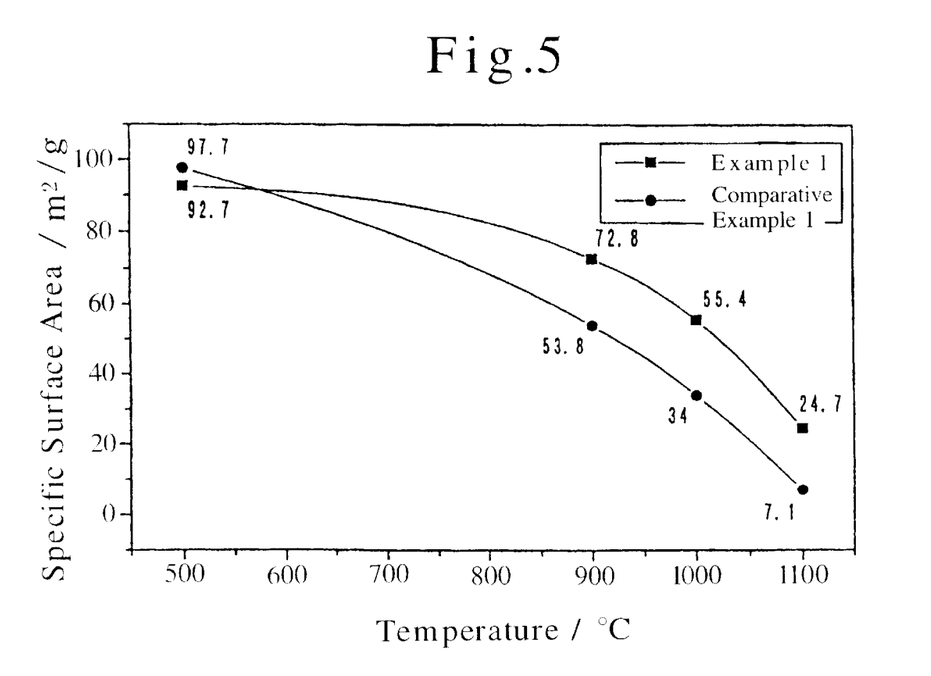
FIG. 5 is a graph indicating comparison of Example 1 and Comparative Example 1 in heat resistance, illustrated in the specific surface area versus calcination temperature.

According to the method of the present invention, the obtained product is calcined at a particular temperature, thereby obtaining an objective composite oxide. The calcination temperature may be selected arbitrarily from the range of 500 to 1000° C. The minimum temperature is set at 500° C. for the following reasons. As can be seen from FIG. 3, which illustrates the results of thermogravimetry using a thermobalance (TG-DTA-812H manufactured by RIGAKU CORPORATION), the weight decrease is completed at 500° C. This means that, with the calcination temperature of lower than 500° C., a zirconium—cerium composite oxide has not been completed, and still has hydroxyl groups, acid radicals, and bases remaining therein, which are released upon use of the composite oxide at a high temperature. Thus, this temperature range cannot be adopted. FIG. 4 is a graph indicating comparison of the change in the crystallite size of the composite oxide of the present invention (prepared in Example 1 below) and that prepared in Comparative Example 1 with respect to the calcination temperature (for 6 hours each) in the temperature range of above 500° C. FIG. 5 is a graph indicating the corresponding change in the specific surface area. From these figures, it is understood that when the present composite oxide is calcined even at a high temperature, the crystallite hardly becomes too large (the degree of sintering is low), and thus the large specific surface area can be maintained. The calcination temperature for obtaining a desired composite oxide may suitably be selected depending on the required or assured specific surface area or bulk density. However, the maximum temperature is limited to 1000° C. or lower in view of the practical point of view as a co-catalyst, in which the specific surface area is an important feature. The calcination temperature is preferably 500 to 800° C., more preferably 500 to 600° C. The duration of calcination may suitably be selected taking the temperature into consideration, and preferably 1 to 10 hours. The composite oxide according to the present invention has excellent heat resistance, and is capable of maintaining the large specific surface area of not smaller than 20 m$^2$/g even after heating at 1100° C. for 6 hours.

The composite oxide of the present invention may be pulverized after the calcination step. The resulting pulverized product, i.e. composite oxide powders, may be used as a co-catalyst for purifying exhaust gas. The pulverization may be carried out sufficiently by pulverizing the calcined composite oxide with an ordinary pulverizer such as a hammer mill to obtain powders of a desired particle size. The particle size of the composite oxide powders for use as a co-catalyst for purifying exhaust gas is not particularly limited, but preferably in the range of 1 to 20 µm. The resulting co-catalyst may be used in a method usually employed for having a catalytic metal carried on a catalyst matrix.

The composite oxide of the present invention is mainly composed of a composite oxide of zirconium and cerium, has large specific surface area, and has excellent heat resistance to enable maintenance of the specific surface area of not smaller than 20 m$^2$/g even after heating at 1100° C. for 6 hours. Accordingly, the present composite oxide may be used, in place of a conventional zirconium—cerium composite oxide, as in particular a co-catalyst for purifying exhaust gas, and is operative in a temperature range above the critical temperature for the conventional composite oxide. In addition, the present composite oxide is quite useful in the field of catalysts for purifying exhaust gas at high efficiency. According to the method of the present invention, the composite oxide having large specific surface area and superior heat resistance can be prepared with good reproducibility and in an economical manner.

EXAMPLES

The present invention will now be explained in detail with reference to Examples and Comparative Examples, but the present invention is not limited to these.

Example 1

81.05 g of zirconium hydroxide powders (manufactured by SANTOKU METAL INDUSTRY, CO., LTD., 99.9% purity, content in terms of zirconium oxide: 40.1% by weight, average particle size: 18.56 µm), 150 ml of a cerium sol (manufactured by RHONE-POULENC CHIMIE S.A., cerium ion content: 5% by weight or less, concentration in terms of cerium oxide: 100 g/liter), and 16.67 ml of an aqueous solution of lanthanum nitrate (manufactured by ANAN KASEI CO., LTD., 99.9% purity, concentration in terms of lanthanum oxide: 150 g/liter) were mixed to prepare a mixture having the weight ratio of $ZrO_2:CeO_2:La_2O_3=65:30:5$. To this mixture was added nitric acid (manufactured by WAKO PURE CHEMICAL INDUSTRIES, LTD., 60–61% purity) so that 6 moles of nitric acid was present per mole of total cerium. Further, deionized water was added to adjust the concentration in terms of oxides to 50 g/liter, thereby obtaining 1 liter of a mixture. Then, 1 liter of this mixture was transferred to a vessel equipped with a reflux condenser, and heated at 100° C. for 12 hours under stirring. After the reacted mixture was allowed to cool down to 20° C., ammonia water (manufactured by WAKO PURE CHEMICAL INDUSTRIES, LTD., $NH_3$ content: 25–28% by weight) was added to the mixture under stirring to adjust the pH to 10 or higher. The resulting product was subjected to solid-liquid separation using a Nutsche filter, thereby obtaining 139.23 g of precipitate. The precipitate thus obtained was subjected to measurement using an X-ray diffractometer "RINT1100" manufactured by RIGAKU CORPORATION with CuK α beam, at X-ray tube voltage of 40 kV and X-ray tube current of 40 mA. The X-ray diffraction pattern is shown in FIG. 1. The exact crystallite size could not be determined, but the X-ray intensity of the peak indicating crystallinity was about 700 cps. Subsequently, the precipitate was calcined at 500° C. for 6 hours to obtain 50 g of a lanthanum-containing zirconium—cerium composite oxide having the specific surface area of 92.7 $m^2$/g. The composite oxide thus obtained was further heated at 900° C., 1000° C., and 1100° C., respectively, for 6 hours each, and the specific surface areas after the heatings are shown in Table 1 and FIG. 5. The crystallite sizes determined from X-ray diffraction patterns are shown in FIG. 4. The specific surface area of the composite oxide after heating at 1100° C. for 6 hours was 24.7 $m^2$/g. Composition analysis revealed that the contents of zirconium, cerium, and lanthanum in the composite oxide were 65.1% by weight, 29.9% by weight, and 5% by weight, respectively, in terms of zirconium oxide, ceric oxide, and lanthanum oxide, respectively.

Example 2

93.52 g of the zirconium hydroxide powders, 100 ml of the cerium sol, and 16.67 ml of the aqueous solution of lanthanum nitrate, all as used in Example 1, were mixed to prepare a mixture having the weight ratio of $ZrO_2:CeO_2:La_2O_3$=75:20:5. To this mixture was added nitric acid so that 6.2 moles of nitric acid was present per mole of total cerium. Further, deionized water was added to adjust the concentration in terms of oxides to 50 g/liter, thereby obtaining 1 liter of a mixture. Then, according to the process described in Example 1, the resulting mixture was heated under stirring, mixed with the ammonia water, and subjected to solid-liquid separation of the resulting product, to thereby obtain 142 g of precipitate. The precipitate was subjected to the measurement using the X-ray diffractometer under the same conditions as described in Example 1. The exact crystallite size could not be determined, but the X-ray intensity of the peak indicating crystallinity was about 700 cps. Subsequently, the precipitate was calcined in the same way as in Example 1 to obtain 50 g of a lanthanum-containing zirconium—cerium composite oxide having the specific surface area of 115.7 $m^2$/g. The composite oxide thus obtained was further heated at 900° C., 1000° C., and 1100° C., respectively, for 6 hours each, and the specific surface areas after the heatings are shown in Table 1. The specific surface area of the composite oxide after heating at 1100° C. for 6 hours was 22.4 $m^2$/g. Composition analysis revealed that the contents of zirconium, cerium, and lanthanum in the composite oxide were 74.9% by weight, 20.2% by weight, and 4.9% by weight, respectively, in terms of zirconium oxide, ceric oxide, and lanthanum oxide, respectively.

Example 3

93.52 g of the zirconium hydroxide powders and 125 ml of the cerium sol, both as used in Example 1, were mixed to prepare a mixture having the weight ratio of $ZrO_2:CeO_2$=75:25. To this mixture was added nitric acid so that 5.5 moles of nitric acid was present per mole of total cerium. Further, deionized water was added to adjust the concentration in terms of oxides to 50 g/liter, thereby obtaining 1 liter of a mixture. Then, the mixture thus obtained was subjected to the same operations as in Example 1, to thereby obtain 141.62 g of precipitate. The precipitate was subjected to the measurement using the X-ray diffractometer under the same conditions as described in Example 1. The exact crystallite size could not be determined, but the X-ray intensity of the peak indicating crystallinity was about 700 cps. Subsequently, the precipitate was subjected to the same operation as in Example 1 to obtain 50 g of a zirconium—cerium composite oxide having the specific surface area of 112.4 $m^2$/g. The composite oxide thus obtained was further heated at 900° C., 1000° C., and 1100° C., respectively, for 6 hours each, and the specific surface areas after the heatings are shown in Table 1. The specific surface area of the composite oxide after heating at 1100° C. for 6 hours was 20.4 $m^2$/g. Composition analysis revealed that the contents of zirconium and cerium in the composite oxide were 75% by weight and 25% by weight, respectively, in terms of zirconium oxide and ceric oxide, respectively.

Example 4

81.05 g of the zirconium hydroxide powders, 150 ml of the cerium sol, both as used in Example 1, and 16.67 ml of an aqueous solution of neodymium nitrate (manufactured by ANAN KASEI CO., LTD., 99.9% purity, concentration in terms of neodymium oxide: 150 g/liter) were mixed to prepare a mixture having the weight ratio of $ZrO_2:CeO_2:Nd_2O_3$=65:30:5. To this mixture was added nitric acid so that 6.5 moles of nitric acid was present per mole of total cerium. Further deionized water was added to adjust the concentration in terms of oxides to 50 g/liter, thereby obtaining 1 liter of a mixture. Then, the mixture thus obtained was subjected to the same operations as in Example 1, to thereby obtain 138.24 g of precipitate. The precipitate was subjected to the measurement using the X-ray diffractometer under the same conditions as described in Example 1. The exact crystallite size could not be determined, but the X-ray intensity of the peak indicating crystallinity was about 700 cps. Subsequently, the precipitate was subjected to the same operation as in Example 1 to obtain 50 g of a neodymium-containing zirconium—cerium composite oxide having the specific surface area of 91.3 $m^2$/g. The composite oxide thus obtained was further heated at 900° C., 1000° C., and 1100° C., respectively, for 6 hours each, and the specific surface areas after the heatings are shown in Table 1. The specific surface area of the composite oxide after heating at 1100° C. for 6 hours was 23.8 $m^2$/g. Composition analysis revealed that the contents of zirconium, cerium, and neodymium in the composite oxide were 65% by weight, 30.1% by weight, and 4.9% by weight, respectively, in terms of zirconium oxide, ceric oxide, and neodymium oxide, respectively.

Example 5

81.05 g of the zirconium hydroxide powders, 150 ml of the cerium sol, both as used in Example 1, and 16.67 ml of an aqueous solution of aluminum nitrate (nonahydrate of aluminum nitrate manufactured by WAKO PURE CHEMICALS, LTD., 99.9% purity, aqueous solution with concentration in terms of aluminum oxide of 150 g/liter) were mixed to prepare a mixture having the weight ratio of $ZrO_2:CeO_2:Al_2O_3=65:30:5$. To this mixture was added nitric acid so that 6.1 moles of nitric acid was present per mole of total cerium. Further, deionized water was added to adjust the concentration in terms of oxides to 50 g/liter, thereby obtaining 1 liter of a mixture. Then, the mixture thus obtained was subjected to the same operations as in Example 1, to thereby obtain 137.94 g of precipitate. The precipitate was subjected to the measurement using the X-ray diffractometer under the same conditions as described in Example 1. The exact crystallite size could not be determined, but the X-ray intensity of the peak indicating crystallinity was about 700 cps. Subsequently, the precipitate was subjected to the same operation as in Example 1 to obtain 50 g of an aluminum-containing zirconium—cerium composite oxide having the specific surface area of 90.9 m$^2$/g. The composite oxide thus obtained was further heated at 900° C., 1000° C., and 1100° C., respectively, for 6 hours each, and the specific surface areas after the heatings are shown in Table 1. The specific surface area of the composite oxide after heating at 1100° C. for 6 hours was 24.2 m$^2$/g. Composition analysis revealed that the contents of zirconium, cerium, and aluminum in the composite oxide were 65.1% by weight, 30% by weight, and 4.9% by weight, respectively, in terms of zirconium oxide, ceric oxide, and aluminum oxide, respectively.

Example 6

81.05 g of the zirconium hydroxide powders, 150 ml of the cerium sol, both as used in Example 1, and 16.67 ml of an aqueous solution of magnesium nitrate (hexahydrate of magnesium nitrate manufactured by WAKO PURE CHEMICALS, LTD., 99.9% purity, aqueous solution with concentration in terms of magnesium oxide of 150 g/liter) were mixed to prepare a mixture having the weight ratio of $ZrO_2:CeO_2:MgO=65:30:5$. To this mixture was added nitric acid so that 6.1 moles of nitric acid was present per mole of total cerium. Further, deionized water was added to adjust the concentration in terms of oxides to 50 g/liter, thereby obtaining 1 liter of a mixture. Then, the mixture thus obtained was subjected to the same operation as in Example 1, to thereby obtain 137.79 g of precipitate. The precipitate was subjected to the measurement using the X-ray diffractometer under the same conditions as described in Example 1. The exact crystallite size could not be determined, but the X-ray intensity of the peak indicating crystallinity was about 700 cps. Subsequently, the precipitate was subjected to the same operations as in Example 1 to obtain 50 g of a magnesium-containing zirconium—cerium composite oxide having the specific surface area of 91.6 m$^2$/g. The composite oxide thus obtained was further heated at 900° C., 1000° C., and 1100° C., respectively, for 6 hours each, and the specific surface areas after the heatings are shown in Table 1. The specific surface area of the composite oxide after heating at 1100° C. for 6 hours was 25.3 m$^2$/g. Composition analysis revealed that the contents of zirconium, cerium, and magnesium in the composite oxide were 65.1% by weight, 30% by weight, and 4.9% by weight, respectively, in terms of zirconium oxide, ceric oxide, and magnesium oxide, respectively.

Example 7

81.05 g of the zirconium hydroxide powders, 150 ml of the cerium sol, and 16.67 ml of the aqueous solution of lanthanum nitrate, all as used in Example 1, were mixed to prepare a mixture having the weight ratio of $ZrO_2:CeO_2:La_2O_3=65:30:5$. To this mixture was added nitric acid so that 7 moles of nitric acid was present per mole of total cerium. Further, deionized water was added to adjust the concentration in terms of oxides to 50 g/liter, thereby obtaining 1 liter of a mixture. Then, the mixture thus obtained was subjected to the same operation as in Example 1, to thereby obtain 138.04 g of precipitate. The precipitate was subjected to the measurement using the X-ray diffractometer under the same conditions as described in Example 1. The exact crystallite size could not be determined, but the X-ray intensity of the peak indicating crystallinity was about 700 cps. Subsequently, the precipitate was subjected to the same operations as in Example 1 to obtain 50 g of a lanthanum-containing zirconium—cerium composite oxide having the specific surface area of 108.1 m$^2$/g. The composite oxide thus obtained was further heated at 900° C., 1000° C., and 1100° C., respectively, for 6 hours each, and the specific surface areas after the heatings are shown in Table 1. The specific surface area of the composite oxide after heating at 1100° C. for 6 hours was 24.5 m$^2$/g. Composition analysis revealed that the contents of zirconium, cerium, and lanthanum in the composite oxide were 65.1% by weight, 30% by weight, and 4.9% by weight, respectively, in terms of zirconium oxide, ceric oxide, and lanthanum oxide, respectively.

Example 8

81.05 g of the zirconium hydroxide powders, 83.3 ml of the cerium sol, and 33.3 ml of the aqueous solution of lanthanum nitrate, all as used in Example 1, were mixed to prepare a mixture having the weight ratio of $ZrO_2:CeO_2:La_2O_3=65:25:10$. To this mixture was added nitric acid so that 5.8 moles of nitric acid was present per mole of total cerium. Further, deionized water was added to adjust the concentration in terms of oxides to 50 g/liter, thereby obtaining 1 liter of a mixture. Then, 1 liter of the mixture was transferred to a pressurized reaction vessel (autoclave), and held for 6 hours while the mixture was stirred under pressure (2 kg/cm$^2$). Then ammonia water was added to the reacted mixture in the same way as in Example 1, and the resulting product was subjected to solid-liquid separation, thereby obtaining 136.53 g of precipitate. The precipitate thus obtained was subjected to measurement using the X-ray diffractometer in the same way as in Example 1. The exact crystallite size could not be determined, but the X-ray intensity of the peak indicating crystallinity was about 700 cps. Subsequently, the precipitate was subjected to the same operation as in Example 1 to obtain 50 g of a lanthanum-containing zirconium—cerium composite oxide having the specific surface area of 102.6 m$^2$/g. The composite oxide thus obtained was further heated at 900° C., 1000° C., and 1100° C., respectively, for 6 hours each, and the specific surface areas after the heatings are shown in Table 1. The specific surface area of the composite oxide after heating at 1100° C. for 6 hours was 27 m$^2$/g. Composition analysis revealed that the contents of zirconium, cerium, and lanthanum in the composite oxide were 65.1% by weight, 24.8% by weight, and 10.1% by weight, respectively, in terms of zirconium oxide, ceric oxide, and lanthanum oxide, respectively.

Comparative Example 1

130 ml of a zirconyl nitrate solution (manufactured by SANTOKU METAL INDUSTRY, CO., LTD., 99% purity, concentration in terms of zirconium oxide: 250 g/liter) 150 ml of the cerium sol, and 16.67 ml of the aqueous solution of lanthanum nitrate were mixed to prepare a mixture having the weight ratio of $ZrO_2:CeO_2:La_2O_3=65:30:5$. To this mixture was added deionized water to adjust the concentration in terms of oxides to 50 g/liter, thereby obtaining 1 liter of a mixture. Then, the mixture thus obtained was subjected to the same operations as in Example 1, to thereby obtain 141.21 g of precipitate. The precipitate thus obtained was in the form of a gel. The precipitate was subjected to the measurement using the X-ray diffractometer under the same conditions as described in Example 1. The X-ray diffraction pattern is shown in FIG. 2. The exact crystallite size could not be determined, but the X-ray intensity of the peak indicating crystallinity was about 500 cps. Subsequently, the precipitate was subjected to the same operation as in Example 1 to obtain 50 g of a lanthanum-containing zirconium—cerium composite oxide having the specific surface area of 97.7 m$^2$/g. The composite oxide thus obtained was further heated at 900° C., 1000° C., and 1100° C., respectively, for 6 hours each, and the specific surface areas after the heatings are shown in Table 1 and FIG. 5. The crystallite sizes determined from X-ray diffraction patterns are shown in FIG. 4. The specific surface area of the composite oxide after heating at 1100° C. for 6 hours was 7.1 m$^2$/g. Composition analysis revealed that the contents of zirconium, cerium, and lanthanum in the composite oxide were 65% by weight, 30.1% by weight, and 4.9% by weight, respectively, in terms of zirconium oxide, ceric oxide, and lanthanum oxide, respectively.

Comparative Example 2

81.05 g of the zirconium hydroxide powders, 150 ml of the cerium sol, and 16.67 ml of the aqueous solution of lanthanum nitrate were mixed to prepare a mixture having the weight ratio of $ZrO_2:CeO_2:La_2O_3=65:30:5$. To this mixture was added nitric acid so that 11 moles of nitric acid was present per mole of total cerium. Further, deionized water was added to adjust the concentration in terms of oxides to 50 g/liter, thereby obtaining 1 liter of a mixture. Then, the mixture thus obtained was subjected to the same operation as in Example 1, to thereby obtain 140.35 g of precipitate. The precipitate thus obtained was in the form of a gel. The precipitate was subjected to the measurement using the X-ray diffractometer under the same conditions as described in Example 1. The exact crystallite size could not be determined, but the X-ray intensity of the peak indicating crystallinity was about 500 cps. Subsequently, the precipitate was subjected to the same operations as in Example 1 to obtain 50 g of a lanthanum-containing zirconium—cerium composite oxide having the specific surface area of 96 m$^2$/g. The composite oxide thus obtained was further heated at 900° C., 1000° C., and 1100° C., respectively, for 6 hours each, and the specific surface areas after the heatings are shown in Table 1. The specific surface area of the composite oxide after heating at 1100° C. for 6 hours was 7.6 m$^2$/g. Composition analysis revealed that the contents of zirconium, cerium, and lanthanum in the composite oxide were 65.1% by weight, 30% by weight, and 4.9% by weight, respectively, in terms of zirconium oxide, ceric oxide, and lanthanum oxide, respectively.

Comparative Example 3

81.05 g of the zirconium hydroxide powders, 150 ml of the cerium sol, and 16.67 ml of the aqueous solution of lanthanum nitrate were mixed to prepare a mixture having the weight ratio of $ZrO_2:CeO_2:La_2O_3=65:30:5$. To this mixture was added nitric acid so that 4.5 moles of nitric acid was present per mole of total cerium. Further, deionized water was added to adjust the concentration in terms of oxides to 50 g/liter, thereby obtaining 1 liter of a mixture. Then, the mixture thus obtained was subjected to the same operation as in Example 1, to thereby obtain 140.67 g of precipitate. The precipitate thus obtained was in the form of a gel. The precipitate was subjected to the measurement using the X-ray diffractometer under the same conditions as described in Example 1. The exact crystallite size could not be determined, but the X-ray intensity of the peak indicating crystallinity was about 500 cps. Subsequently, the precipitate was subjected to the same operations as in Example 1 to obtain 50 g of a lanthanum-containing zirconium—cerium composite oxide having the specific surface area of 98.7 m$^2$/g. The composite oxide thus obtained was further heated at 900° C., 1000° C., and 1100° C., respectively, for 6 hours each, and the specific surface areas after the heatings are shown in Table 1. The specific surface area of the composite oxide after heating at 1100° C. for 6 hours was 3.3 m$^2$/g. Composition analysis revealed that the contents of zirconium, cerium, and lanthanum in the composite oxide were 65% by weight, 30% by weight, and 5% by weight, respectively, in terms of zirconium oxide, ceric oxide, and lanthanum oxide, respectively.

Comparative Example 4

650 ml of a zirconium sol (99.9% purity, concentration in terms of zirconium oxide: 50 g/liter) prepared by hydrolysis of zirconium oxychloride, 150 ml of the cerium sol, and 16.67 ml of the aqueous solution of lanthanum nitrate were mixed to prepare a mixture having the weight ratio of $ZrO_2:CeO_2:La_2O_3=65:30:5$. To this mixture was added deionized water to adjust the concentration in terms of oxides to 50 g/liter, thereby obtaining 1 liter of a mixture. Then, the mixture thus obtained was subjected to the same operations as in Example 1, to thereby obtain 141.68 g of precipitate. The precipitate was subjected to the measurement using the X-ray diffractometer under the same conditions as described in Example 1. The exact crystallite size could not be determined, but the X-ray intensity of the peak indicating crystallinity was about 500 cps. Subsequently, the precipitate was subjected to the same operation as in Example 1 to obtain 50 g of a lanthanum-containing zirconium—cerium composite oxide having the specific surface area of 115.7 m$^2$/g. In the composite oxide thus obtained, 0.18% by weight of chlorine was detected. The composite oxide was further heated at 900° C., 1000° C., and 1100° C., respectively, for 6 hours each, and the specific surface areas after the heatings are shown in Table 1. The specific surface area of the composite oxide after heating at 1100° C. for 6 hours was 6.9 m$^2$/g. Composition analysis revealed that the contents of zirconium, cerium, and lanthanum in the composite oxide were 64.9% by weight, 30.2% by weight, 4.9% by weight, respectively, in terms of zirconium oxide, ceric oxide, and lanthanum oxide, respectively.

TABLE 1

| Sample | Composition (% by weight) | | | | | |
| --- | --- | --- | --- | --- | --- | --- |
| | $ZrO_2$ | $CeO_2$ | $La_2O_3$ | $Nd_2O_3$ | $Al_2O_3$ | $MgO$ |
| Example 1 | 65.1 | 29.2 | 5 | — | — | — |
| Example 2 | 74.9 | 20.2 | 4.9 | — | — | — |
| Example 3 | 75 | 25 | — | — | — | — |
| Example 4 | 65 | 30.1 | — | 4.9 | — | — |
| Example 5 | 65.1 | 30 | — | — | 4.9 | — |
| Example 6 | 65.1 | 30 | — | — | — | 4.9 |

TABLE 1-continued

| Example 7 | 65.1 | 30 | 4.9 | — | — | — |
| Example 8 | 65.1 | 24.8 | 10.1 | — | — | — |
| Comp. Ex. 1 | 65 | 30.1 | 4.9 | — | — | — |
| Comp. Ex. 2 | 65.1 | 30 | 4.9 | — | — | — |
| Comp. Ex. 3 | 65 | 30 | 5 | — | — | — |
| Comp. Ex. 4 | 64.9 | 30.2 | 4.9 | — | — | — |

| | Specific Surface Area (m$^2$/g) | | | |
|---|---|---|---|---|
| Sample | 500° C. × 6 hrs. | 900° C. × 6 hrs. | 1000° C. × 6 hrs. | 1100° C. × 6 hrs. |
| Example 1 | 92.7 | 72.8 | 55.4 | 24.7 |
| Example 2 | 115.7 | 70.9 | 51.7 | 22.4 |
| Example 3 | 112.4 | 70.4 | 52 | 20.4 |
| Example 4 | 91.3 | 70.9 | 54.9 | 23.8 |
| Example 5 | 90.9 | 71.2 | 55 | 24.2 |
| Example 6 | 91.6 | 72.6 | 56.1 | 25.3 |
| Example 7 | 108.1 | 76.4 | 60.4 | 24.5 |
| Example 8 | 102.6 | 81.7 | 63.1 | 27 |
| Comp. Ex. 1 | 97.7 | 53.8 | 34 | 7.1 |
| Comp. Ex. 2 | 96 | 51.4 | 32.9 | 7.6 |
| Comp. Ex. 3 | 98.7 | 41.3 | 25.4 | 3.3 |
| Comp. Ex. 4 | 115.7 | 70 | 39.1 | 6.9 |

What is claimed is:

1. A method for preparing the zirconium—cerium composite oxide comprising zirconium and cerium at a weight ratio in a range of 51 to 95:49 to 5 in terms of zirconium oxide and ceric oxide, said composite oxide having a specific surface area of not smaller than 50 m$^2$/g, wherein said composite oxide is capable of maintaining a specific surface area of not smaller than 20 m$^2$/g even after heating at 1100° C. for 6 hours, said method comprising the steps of:

reacting under heating a mixture comprising zirconium hydroxide powders having an average particle size of 0.5 to 50 μm and a cerium sol having an average colloidal particle size of 3 to 100 nm, in the presence of 5 to 10 moles of nitric acid per mole of cerium in said mixture, adding a base, and reacting a resulting mixture to precipitate a product, and calcining said product at 500 to 1000° C.

2. The method of claim 1 wherein said mixture further comprises a metal salt selected from the group consisting of salts of yttrium, scandium, lanthanum, praseodymium, neodymium, samarium, europium, gadolinium, magnesium, calcium, barium, aluminum, titanium, and hafnium, and mixtures thereof.

3. The method of claim 1 wherein said step of reacting under heating in the presence of nitric acid is carried out at a temperature of 60 to 150° C. for 1 to 36 hours.

4. The method of claim 1 wherein said reacting under heating in said step of reacting under heating in the presence of nitric acid is carried out under pressure of 1.5 to 10 kg/cm$^2$.

* * * * *

UNITED STATES PATENT AND TRADEMARK OFFICE
CERTIFICATE OF CORRECTION

PATENT NO. : 6,171,572 B1
DATED : January 9, 2001
INVENTOR(S) : Shigeru Aozasa

It is certified that error appears in the above-identified patent and that said Letters Patent is hereby corrected as shown below:

Title page,
Item [54], Title, change "METHOD FOR PREPARING A ZIRCONIUM-CERIUM COMPOSITE OXIDE" to -- ZIRCONIUM-CERIUM COMPOSITE OXIDE, METHOD FOR PREPARING THE SAME, AND CO-CATALYST FOR PURIFYING EXHAUST GAS --.

Signed and Sealed this

Eleventh Day of December, 2001

Attest:

*Nicholas P. Godici*

NICHOLAS P. GODICI
*Attesting Officer*  *Acting Director of the United States Patent and Trademark Office*